United States Patent
Rousseau et al.

[11] Patent Number: 6,157,439
[45] Date of Patent: Dec. 5, 2000

[54] COPY SYSTEM WITH DOCUMENT PREVIEWING

[75] Inventors: Paul Rousseau, Sunnyvale; Daniel Robuck, Campbell, both of Calif.

[73] Assignee: Hewlett-Packard Company, Palo Alto, Calif.

[21] Appl. No.: 09/299,690

[22] Filed: Apr. 26, 1999

[51] Int. Cl.[7] .......................... G03B 27/52; G03B 13/26; G03B 27/36; H04N 1/40; G03G 15/00

[52] U.S. Cl. .................. 355/61; 355/44; 355/59; 355/61; 355/202; 355/218; 358/287; 358/449; 399/377; 395/106

[58] Field of Search ................... 355/61, 59, 44, 355/202, 218; 358/287, 449; 399/377; 395/106

[56] References Cited

U.S. PATENT DOCUMENTS

| | | | |
|---|---|---|---|
| 4,174,175 | 11/1979 | DiMaria | 355/44 |
| 4,656,524 | 4/1987 | Norris et al. | 358/280 |
| 4,656,525 | 4/1987 | Norris | 358/280 |
| 4,837,635 | 6/1989 | Santos | 358/287 |
| 4,914,475 | 4/1990 | Sugishima et al. | 355/202 |
| 5,049,932 | 9/1991 | Sumida | 355/218 |
| 5,086,317 | 2/1992 | Sugishima et al. | 355/218 |
| 5,119,135 | 6/1992 | Baldwin | 355/218 |
| 5,191,440 | 3/1993 | Levine | 358/450 |
| 5,311,248 | 5/1994 | Iwata | 355/61 |
| 5,327,261 | 7/1994 | Hirota | 359/449 |
| 5,710,967 | 1/1998 | Motoyama | 399/377 |
| 5,966,503 | 10/1999 | van Vliembergen et al. | 395/106 |

*Primary Examiner*—David M. Gray
*Assistant Examiner*—R. Bindingnavele

[57] ABSTRACT

A document copy system includes a preview sensor that is dedicated to document previewing and distinct from any other sensor that is involved in the document copying process. The preview sensor is preferably a two-dimensional sensor array that captures the outline of an entire document in parallel. The captured document outline is previewed on a display device relative to an actual print area that is defined by the copy system. In an enhanced embodiment of the copy system, the preview sensor captures an image that is printed on the document in addition to the outline of the document, so that the image of the document is also previewed relative to the print area. Providing a dedicated preview sensor that captures document position and image data in parallel enables real-time display of a document relative to the print area.

19 Claims, 6 Drawing Sheets

COPY SYSTEM WITH DOCUMENT PREVIEWING

TECHNICAL FIELD

The invention relates to document copying systems, and more particularly to a copy system that includes document previewing.

BACKGROUND OF THE INVENTION

Copying a document on a copy system typically involves placing a document (either manually or automatically) in contact with a copy surface. Because most copy machines accommodate different size documents, the copy surface is usually larger than a typical 8.5 inch×11 inch (215.9 mm×279.4 mm) piece of paper. As a result of the large copy surface, documents can be placed on the copy surface in positions that do not correspond to the particular location required for copying, which will be referred to herein as the "copy area" or "print area." Documents located in the wrong position result in unacceptable copies that are usually discarded, wasting time and resources.

Properly locating a document on a copy surface is further complicated when features such as magnification or reduction are utilized. When magnification or reduction features are utilized, it is difficult to determine exactly how the document fits within the actual copy area, and it is difficult to determine how images on the document will appear on the copy.

In order to determine the appearance of a document copy before a copy is actually generated, it would be advantageous to have a copy system that enables document previewing. In conventional photocopiers, document copying is accomplished by illuminating a document and then directing reflected light from the document onto a photosensitive belt or platen. Changes in electrical charge on the photosensitive belt or platen are then utilized to transfer toner to a new piece of paper. While conventional copiers work well for their intended purpose, the copiers do not include sensing hardware that can be easily utilized for document previewing.

In addition to conventional copiers, copy systems have been developed that utilize electronic imaging techniques to copy images from documents. Systems utilizing electronic imaging have been equipped with document previewing capability. Known copy systems with document previewing capability are disclosed in U.S. Pat. No. 4,656,524 entitled "Electronic Imaging Copier," issued to Norris et al., and U.S. Pat. No. 4,656,525 entitled "Electronic Imaging Copier," issued to Norris. Both copiers of Norris utilize a photo responsive device such as a linear charged coupled device (CCD) array to capture an electronic image of the target document. The electronic image is utilized to print a copy of the target document. The electronic image is captured by passing the linear CCD array by the document in a line-by-line manner.

Previewing a document with the Norris copiers involves scanning the document with a linear CCD array to create electronic image data and then displaying the electronic image data on a display device. The Norris copiers utilize the same scanning hardware for document previewing as is used for document copying. While the previewing feature of Norris works well for its intended purpose, previewing a document utilizing the same scanning hardware as is used for document copying requires a line-by-line scan of the document. The mechanical movements required for line-by-line scanning are time consuming and prevent real-time previewing of the target document.

Known preview systems have also been applied in image scanners that are used to create an electronic copy of a document. For example, an image scanner that includes a preview system is disclosed in U.S. Pat. No. 4,837,635 entitled "A Scanning System in which a Portion of a Preview Scan Image of a Picture Displaced on a Screen is Selected and a Corresponding Portion of the Picture is Scanned in a Final Scan," issued to Santos and assigned to the assignee of the present invention. In Santos, the scanner can perform either a preview scan or a final scan. The preview scan is simply a lower resolution version of the final scan. Again, the same scanner hardware is utilized to perform the preview scan or the final scan. Whether the scanner is performing a preview scan or a final scan, the scanner hardware must sweep across the document in a line-by-line manner to capture the electronic image data. Although the preview system of Santos works well for its intended purpose, the time required to scan a document limits the ability to provide real-time previewing.

As a result of the drawbacks regarding prior art preview systems, what is needed is a preview system that can display a document located on a copy surface without utilizing the document copy hardware, and what is needed is a preview system that can display a document in real-time.

SUMMARY OF THE INVENTION

A document copy system includes a preview sensor that is dedicated to document previewing and distinct from any other sensor that is involved in the document copying process. In one embodiment, the preview sensor is a two-dimensional sensor array that captures the outline of an entire document using parallel processing. The captured document outline is previewed on a display device to determine its position relative to an actual print area that is defined by the copy system. In an enhanced embodiment of the copy system, the preview sensor captures an image that is on the document in addition to the outline of the document, so that the image of the document is also previewed relative to the print area. Providing a dedicated preview sensor that captures document position and image data in parallel enables real-time display of a document relative to the print area.

A document copy system having document previewing capability includes a copy/scan surface, a copy/scan system, a preview system, and a display device. The copy/scan surface is preferably a conventional glass platen, as utilized in conventional photocopy machines and conventional document scanners. The copy/scan surface is transparent and provides a surface on which the desired document is placed for creating paper or electronic copies. Typically, the copy/scan surface is integrated with a cover that improves illumination of a document during copying.

The copy/scan system may include a conventional photocopy system, a conventional document scanning system, or a hybrid copy system that combines document scanning and printing to produce document copies. The conventional photocopy system includes a light source that illuminates a document and a photoreceptor, such as a photosensitive belt or a photosensitive platen, that receives reflected light from the illuminated document. In operation, a document placed on the copy/scan surface is illuminated, and reflected light is incident on the photoreceptor surface. The incident light on the photoreceptor surface alters an electrical charge on the photoreceptor surface and the altered electrical charge is utilized to transfer printing toner to the copy medium, typically paper. In the conventional photocopying process, reflected light from the illuminated document is never transformed into electronic image data that can be easily displayed.

The conventional document scanning system includes a light source and a linear photosensor array. In operation, a document placed on the copy/scan surface is illuminated and the linear photosensor array is scanned across the document to create an electronic copy of an image. The electronic copy of the image can then be stored in memory, displayed, printed, and/or edited. As described above, known previewing techniques utilize a low resolution scan with the linear photosensor array to create a preview image.

The hybrid copy system combines electronic scanning and printing to copy a document. In the hybrid copy system, the document is scanned to create electronic image data. The electronic image data is used to drive a printer, such as a laser printer, to create a copy of the document that is located on the copy/scan surface.

Regardless of the type of copy/scan system that is utilized to make document copies, in accordance with the invention, a dedicated preview system is provided that operates in addition to the copy/scan system. In an embodiment, the preview system is a combination of hardware and software that is independent of the copy/scan system. The preview system displays, on the display device, the outline of a document that is placed on the copy/scan surface. In one embodiment, the outline of the document is displayed relative to an outline of the actual print area of the copy/scan system. In another embodiment, the preview system displays the image of the document relative to the actual print area in addition to the display of the outline of the document relative to the actual print area.

An embodiment of the preview system includes the copy/scan surface, a light source, optics, a preview sensor, a processing unit, and the display device. The light source provides light to the copy/scan surface in order to illuminate a document that is located on the copy/scan surface. The intensity of light required by the light source depends on whether or not the preview system is configured to display the outline of a document or the image on the document in addition to the outline of the document.

The optics preferably include a wide angle lens that enables optical energy from the entire copy/scan surface to be directed to the preview sensor. The display device is preferably an LCD display device that is integrated with the copy/scan system.

The preview sensor is dedicated to the previewing system and is separate from the sensors that are utilized in the copy/scan system for copying and/or scanning. In an embodiment, the preview sensor includes a two-dimensional photosensor array that can capture an entire image in parallel without scanning across the copy surface. The preview sensor is operated at a refresh rate of greater than four frames per second, and preferably greater than twenty-four frames per second, in order to display a real-time representation of the document relative to the print area. The preview sensor can be fixed with respect to the copy/scan surface, however, the sensor may be moveable in order to accommodate for features such as enlarging or reducing.

The processing unit is preferably a hardware and software system that receives signals from the preview sensor and transforms the signals into display signals that are compatible with the display device. The processing unit can also take into account paper size and magnification or reduction in order to display a representation of the print area and the target document on the display device. The processing unit can be dedicated to the preview system or the processing unit can be shared with the copy/scan system.

In operation of the preview system, a document is placed on the copy/scan surface and the document is illuminated by the light source. Light reflected from the document is captured by the preview sensor and the preview sensor transmits image signals to the processing unit. The processing unit generates display signals and a representation of the document is displayed on the display device. The representation of the document displayed on the display device is shown relative to the print area of the copy/scan system. If the document is moved on the copy/scan surface, then the movement is shown on the display device, preferably in real-time. If the copy/scan system is programmed to generate a magnified copy of the original document, then a magnified version of the document is displayed on the display device relative to the print area of the copy/scan system. Similarly, if the copy/scan system is programmed to generate a reduced copy of the original, then a reduced image of the original document is displayed on the display device relative to the outline of the print area. Once the document is satisfactorily positioned on the copy/scan surface, as indicated by the preview system, the copy/scan system is utilized to generate a copy, either printed or electronic, of the document.

Because the preview system has a dedicated preview sensor, the preview sensor can be a lower resolution two-dimensional sensor array that captures images of the entire document in parallel without having to mechanically scan across the document. Capturing images of an entire document in parallel enables the preview system to display an image of the document in real-time, or near real-time. Real-time previewing enables a user to quickly preview a document while making subtle adjustments in order to generate a desired copy on the first attempt.

DETAILED DESCRIPTION

Figure 1:
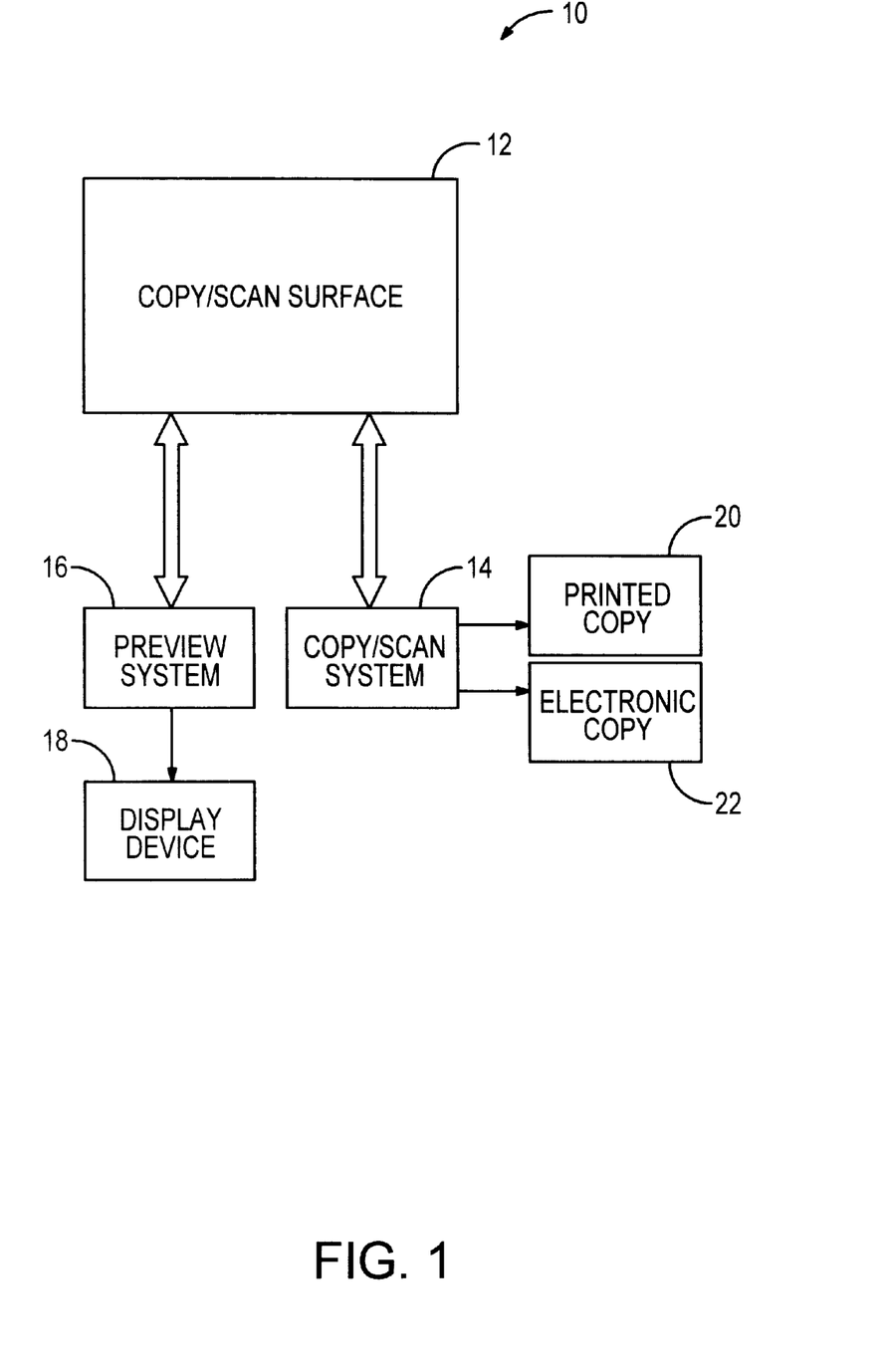
FIG. 1 is a depiction of a preferred copy system with document previewing capabilities in accordance with the invention.

An embodiment of a document copy system 10 is depicted in FIG. 1. The document copy system includes a copy/scan surface 12, a copy/scan system 14, a preview system 16, and a display device 18. As shown, the copy/scan surface may generate a printed copy 20 of a document, or an electronic copy 22 of a document. The elements of the document copy system are described first, followed by a description of the system operation.

The copy/scan surface 12 is preferably a conventional glass platen as utilized in conventional photocopy machines and conventional document scanners. The copy/scan surface is transparent and provides a surface on which the desired document is placed for copying. Typically, the copy/scan surface is integrated with a cover that improves illumination of a document during copying. Documents can be manually placed on the copy/scan surface, or in systems with automatic document feeders, documents can be automatically placed on the copy/scan surface.

The copy/scan system 14 includes a conventional photocopy system, a conventional scanning system, or a hybrid copy system that combines document scanning with printing to produce document copies. The conventional photocopy system includes a light source to illuminate a document and a photoreceptor such as a photosensitive belt or a photosensitive platen to receive reflected light from the illuminated document. In operation, a document placed on the copy/scan surface is illuminated, and reflected light is incident on the photoreceptor surface. The reflected light incident on the photoreceptor surface alters the electrical charge on the photoreceptor surface in a pattern that corresponds to the image on the document. The altered electrical charge is utilized to transfer printing toner to a copy medium such as paper, thereby creating a printed copy of the document. In the conventional photocopying process, reflected light from the illuminated document is never transformed into electronic image data that can be easily displayed on a display device.

The conventional document scanning system includes a light source and a linear photosensor array. In operation, a document located on the copy/scan surface is illuminated and the linear photosensor array is scanned across the document to create an electronic copy of the image that is on the document. Electronic image data is collected during scanning in a line-by-line manner, with the resolution of the image depending on the number of lines that are scanned within a given distance during movement in the vertical direction and the density of pixel information that is generated relative to the horizontal direction. Electronic image data representing the scanned document can readily be stored in memory, displayed, printed, and/or edited.

The hybrid copy system combines electronic scanning and printing to copy a document. In the hybrid copy system, a document is scanned to create electronic image data. Electronic image data is then used to drive a printer, such as a laser printer, to create a copy of the document that is located on the copy/scan surface.

In an embodiment, the preview system 16 is a combination of hardware and software that is substantially separate from the copy/scan system. The preview system displays, on the display device 18, the outline of a document that is placed on the copy/scan surface 12. In an embodiment, the outline of the document is displayed relative to an outline of the actual print area of the copy/scan system. In another embodiment, the preview system displays the image of the document relative to the actual print area in addition to the outline of the document. The display device is preferably an LCD display device that is integrated with the copy/scan system, although other types of display devices, such as CRT displays, are possible. For example, the display device may be the display device of a personal computer that is connected to a scanner. The structure of the preview system is described in more detail with reference to FIGS. 2 and 3, and examples of the operation of the preview system are described with reference to FIGS. 4 through 9.

Figure 2:
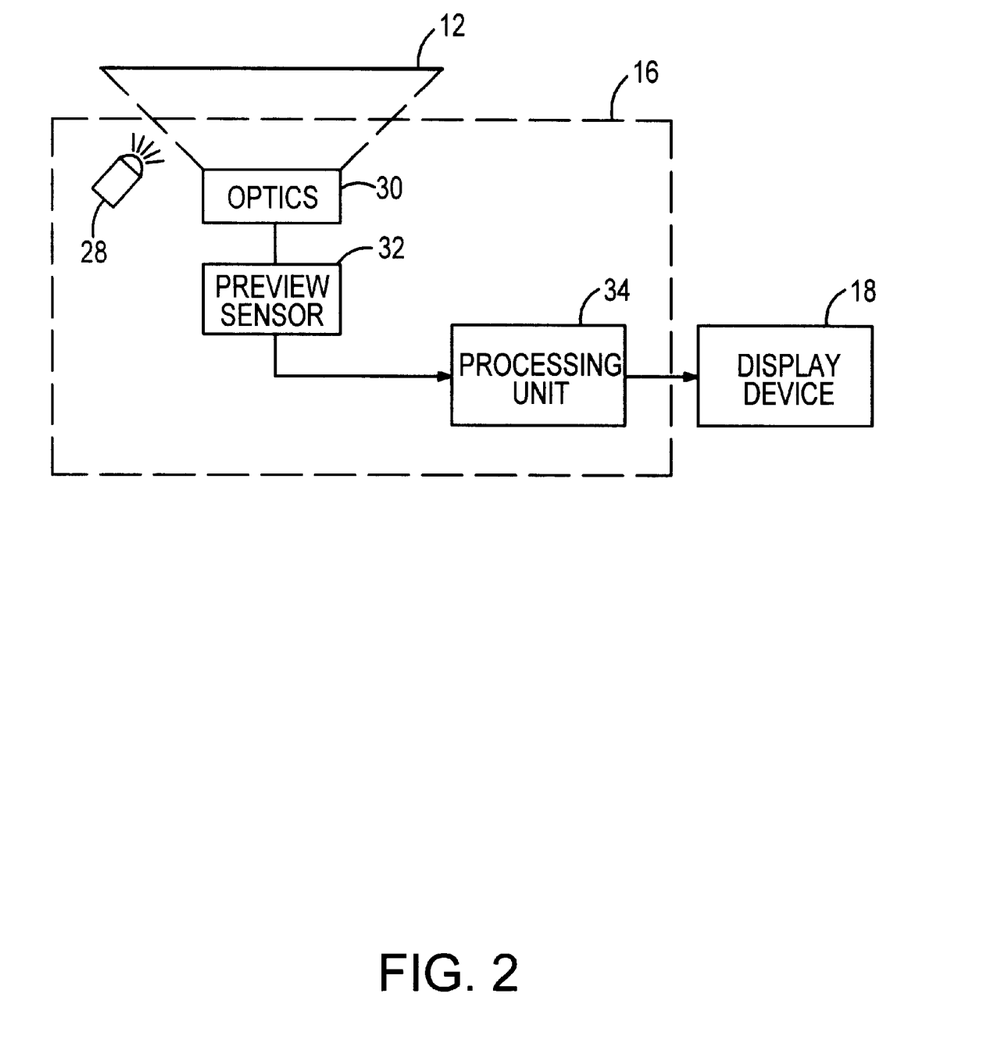
FIG. 2 is a depiction of a preferred preview system in accordance with the invention.

Referring to FIG. 2, an embodiment of the preview system 16 includes the copy/scan surface 12, a light source 28, optics 30, a preview sensor 32, a processing unit 34, and the display device 18. The light source provides light to the copy/scan surface in order to illuminate a document that is located on the copy/scan surface. The intensity of light required by the light source depends on whether or not the preview system is configured to display the outline of a document or the image on the document in addition to the outline. In an embodiment, the light source is preferably dedicated to the preview system, although the light source may be shared with the copy/scan system 14 in some embodiments.

The optics 30 preferably include a wide angle lens that enables optical energy from the entire copy/scan surface to be directed to the preview sensor 32. In an embodiment, the optics are dedicated to the preview system 16, although the optics may be shared with the copy/scan system 14 in some embodiments. Although optics are utilized in the embodiment, optics are not critical.

The preview sensor 32 may include a two-dimensional photosensor array that can capture an entire image up to the size of the copy/scan surface 12. Thus, the preview sensor can capture an entire image in parallel without being "scanned" across the copy surface. The preview sensor is dedicated to the previewing system and as shown in FIGS. 1 and 2, the preview sensor is separate from any sensors that are utilized in the copy/scan system 14 for copying and/or scanning. In one embodiment, the preview sensor is a CCD array that is operated at a refresh rate of greater than four frames per second, and preferably greater than twenty-four frames per second, in order to display a "real-time" representation of the document relative to the print area. In one embodiment the preview sensor is fixed with respect to the copy/scan surface, however in other embodiments, the sensor may move to accommodate features such as enlarging or reducing.

Typically, the processing unit 34 is a hardware and software system that receives signals from the preview sensor 32 and transforms the signals into display signals that are compatible with the display device 18. The processing unit may also generate the display signals for the print area of the copy/scan system 14. That is, the processing unit takes into account paper size and magnification or reduction, in order to display a representation of the print area on the display device. The processing unit can also be configured to support the optics 30 in order to, for example, provide a higher resolution display of a document image through electronic manipulation. The processing unit can be dedicated to the preview system 16 or the processing unit can be shared with the copy/scan system 14.

Figure 3:
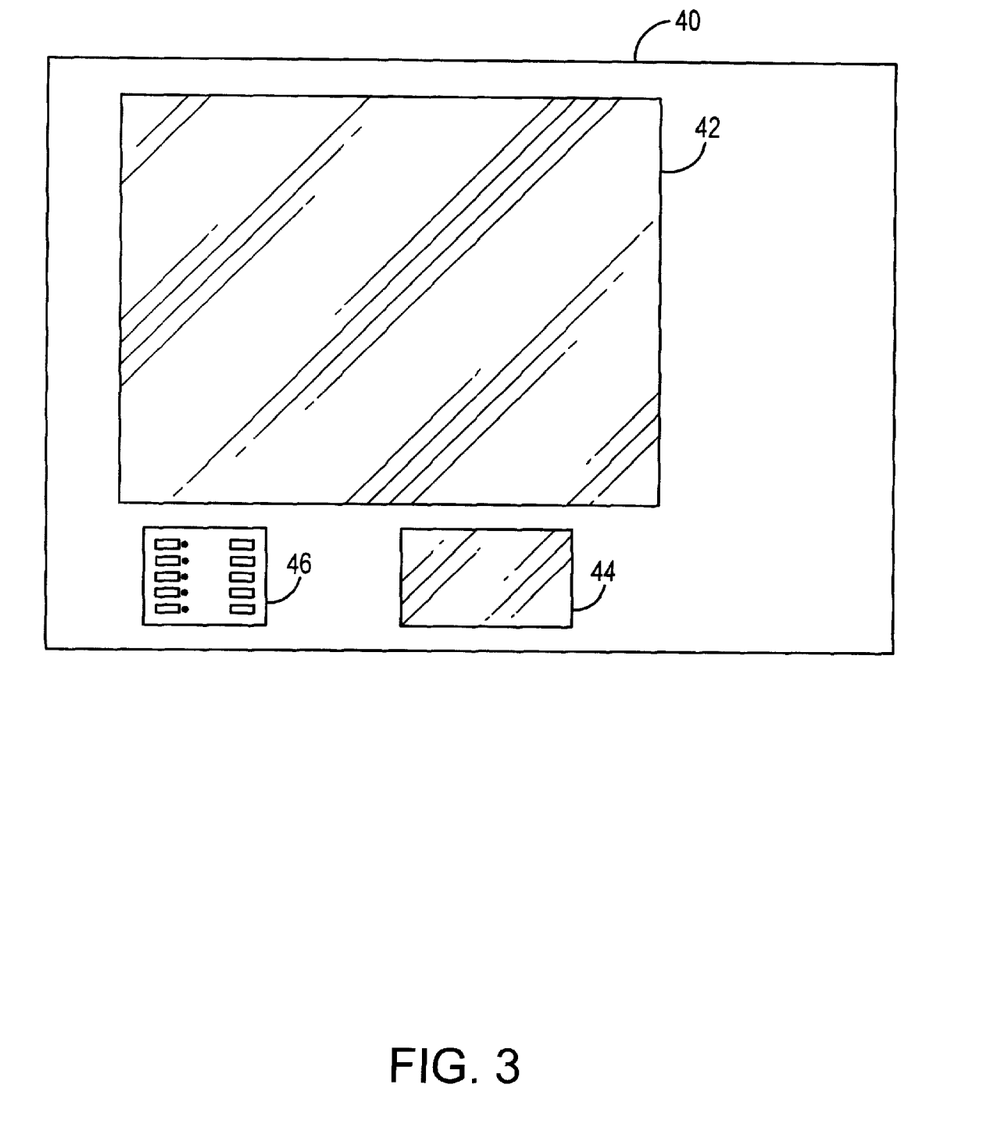
FIG. 3 is a top view of an exemplary copy system that includes document previewing in accordance with the invention.

FIG. 3 is a top view of an exemplary copy system 40 that includes document previewing. As described above, the copy/scan surface 42 is a glass platen upon which a document is placed face down. The display device 44 is preferably an LCD display that is integrated into the top surface of the copy system. The top surface of the copy system also includes a control panel 46 which is used to operate the copy system. In addition, although not shown, the copy system preferably includes a cover that fits over the copy/scan surface in order to improve illumination of documents. The cover may include an automatic document feeder that positions documents on the copy/scan surface. In embodiments involving document scanners, the display device may not be integrated into the scanner. For example, the display device may be the CRT monitor of a personal computer.

In operation, a document is placed on the copy/scan surface 12 of the preview system 16 of FIGS. 1 and 2 and the document is illuminated by the light source 28. Light reflected from the document is directed onto the preview sensor 32 by the optics 30. The preview sensor captures the reflected light and generates electrical signals which are transmitted to the processing unit 34. The processing unit generates display signals from the electrical signals and a representation of the document is displayed on the display device 18. Preferably, the document is displayed relative to the print area of the associated copy/scan system 14.

Figure 4:
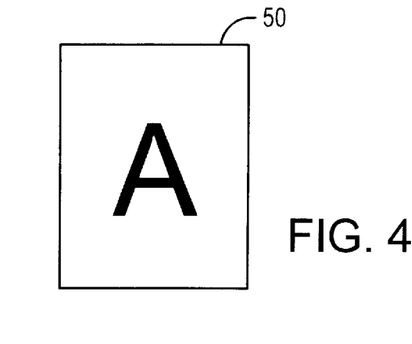
FIG. 4 is a depiction of an exemplary document that is printed on 8.5 inch by 11 inch (215.9 mm×279.4 mm) paper.

FIGS. 4 through 9 are examples that help describe the operation of the preview system 16 that is integrated into a copy system 10 as shown in FIGS. 1 through 3. FIG. 4 is a depiction of an exemplary document 50 that consists of a standard 8.5 inch by 11 inch (215.9 mm×279.4 mm) piece of paper. An "A" is printed approximately in the center of the paper. The document shown in FIG. 4 is utilized in FIGS. 5 through 9 to describe the operation of the preview system.

Figure 5A:
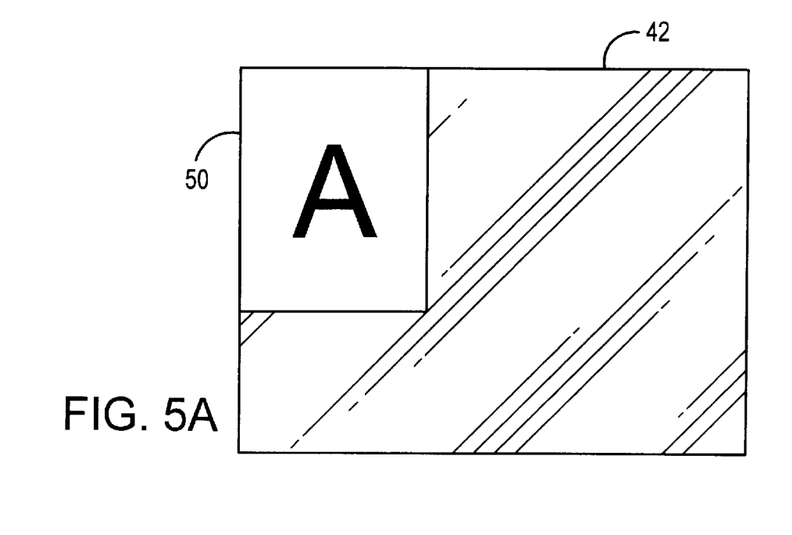
FIG. 5A is a depiction of a document in a standard position on a copy/scan surface.
Figure 5B:
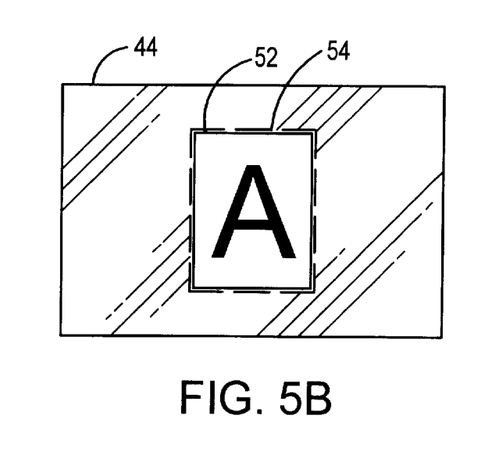
FIG. 5B is a depiction of the display of the document shown in FIG. 5A relative to the print area in accordance with the invention.

Referring to FIG. 5A, the document 50 shown in FIG. 4 is placed on the copy/scan surface 42 which is similar to the copy/scan surface that is shown in FIG. 3. Although the A is visible on the document as shown in FIG. 5A for explanation purposes, in most applications the A will be face down on the copy/scan surface such that the A, also referred to as the image, is not visible to a user. FIG. 5B is a depiction of the display device 44 as shown in FIG. 3 that includes a preview of the document that is located on the copy/scan surface as shown in FIG. 5A. The print area 54 within the display device is identified by the dashed-line box. In the example of FIGS. 5A and 5B, the document is an 8.5 inch by 11 inch piece of paper and the print area shown on the display device represents an 8.5 inch by 11 inch piece of paper. If the paper size were changed, the print area would be changed accordingly. In FIG. 5A, the document is aligned on the copy/scan surface in a position that coincides with the print area, and thus in FIG. 5B the document outline 52 is displayed by the preview system as being entirely within the print area.

It should be noted that in the examples described with reference to FIGS. 5 through 9, the image on the document 50, in addition to the outline of the document, is previewed on the display device 44. However, in another embodiment, only the outline of the document is displayed relative to the print area 54. Displaying only the outline of the document would enable the use of a lower resolution preview sensor and less illumination. All of the examples described with reference to FIGS. 5 through 9 can be implemented with the document outline only.

Figure 6A:
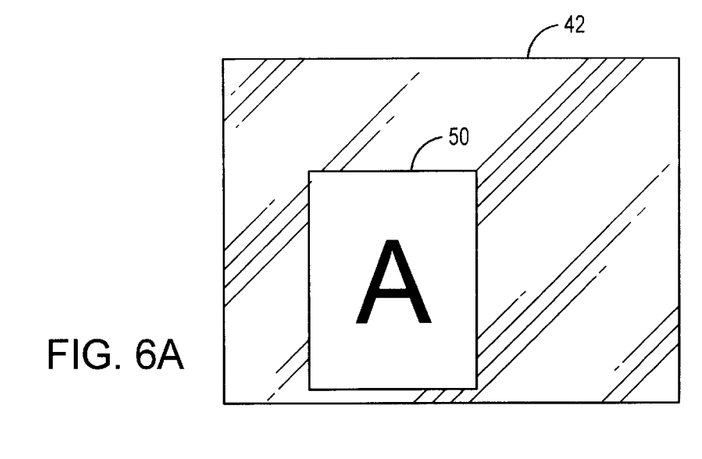
FIG. 6A is a depiction of a document in a lowered and to the right position on a copy/scan surface.
Figure 6B:
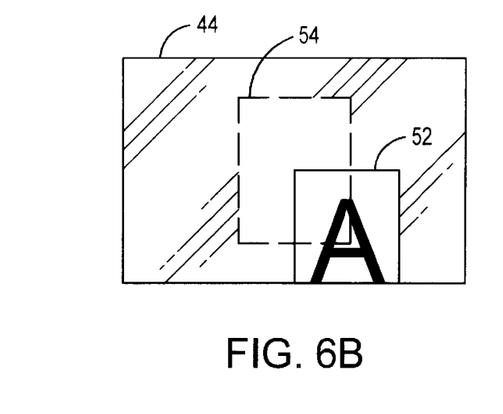
FIG. 6B is a depiction of the display of the document shown in FIG. 6A relative to the print area in accordance with the invention.

FIG. 6A depicts the document 50 in a different position on the copy/scan surface 42. In FIG. 6A, the document is moved down and to the right relative to the copy/scan surface. FIG. 6B depicts the display of the document relative to the print area 54. As shown in FIG. 6B, the outline 52 of the document and the image of the document are shifted down and to the right relative to the identified print area. If a copy operation is initiated with the document in the position as shown, only the upper left corner of the document would be copied. By displaying the image of the document relative to the print area utilizing the preview system, undesired positioning can be corrected before a copy or scan operation is initiated.

In an embodiment, the preview system 16 operates in real-time, such that motion of the document relative to the copy/scan surface is displayed on the display device. For example, a user can adjust the position of the document on the copy/scan surface 12 and 42 while obtaining real-time feedback until the document is positioned properly. Providing real-time previewing saves time, especially when compared to the time that would be required to scan the document utilizing the copy/scan system upon each position change.

Figure 7A:
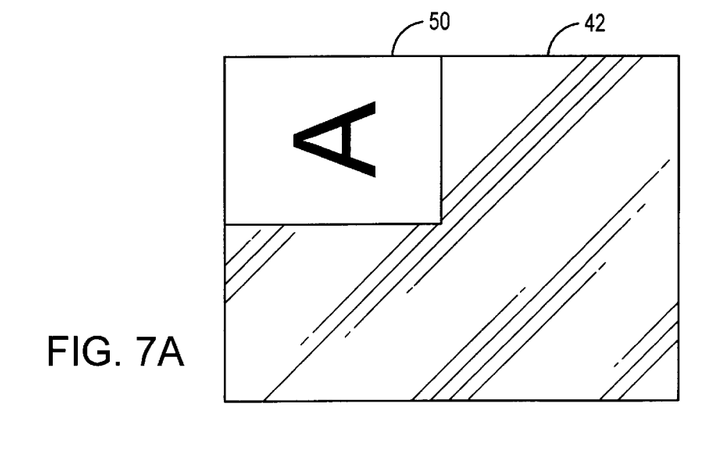
FIG. 7A is a depiction of a document in a rotated position on a copy/scan surface.
Figure 7B:
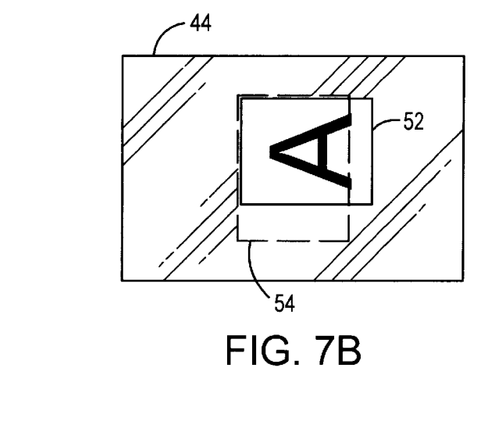
FIG. 7B is a depiction of the display of the document shown in FIG. 7A relative to the print area in accordance with the invention.

FIG. 7A depicts the document 50 after being rotated 90° relative to the position of the document in FIG. 5A. FIG. 7B depicts the display of the rotated document relative to the print area 54. As shown in FIG. 7B, the outline 52 of the document and the image of the document are rotated 90° relative to the identified print area. Because the print area remains in the "portrait" layout and because the document is now in the "landscape" layout, portions of the document fall outside of the print area. Initiation of a print operation will print only the portion of the document that is within the identified print area.

Figure 8A:
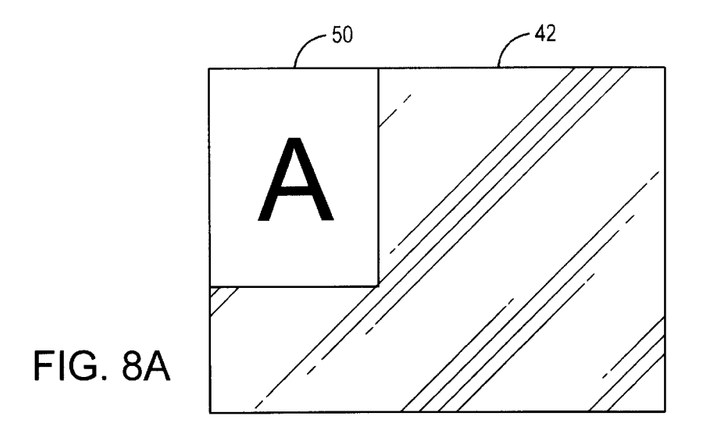
FIG. 8A is a depiction of a document in a standard position on a copy/scan surface.
Figure 8B:
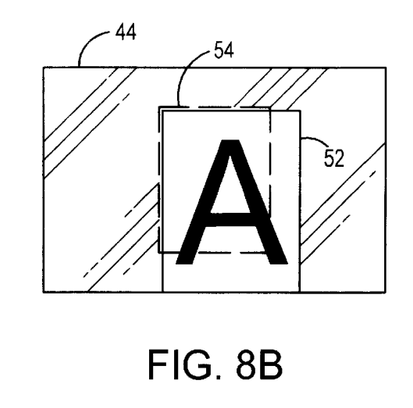
FIG. 8B is a depiction of the display of an enlarged version of the document shown in FIG. 8A relative to the print area in accordance with the invention.

FIG. 8A depicts the document 50 in the same position as in FIG. 5A, however, the copy system has been programmed to enlarge, or magnify, the document before copying or scanning. FIG. 8B depicts the display of the enlarged document outline 52 and the enlarged document image relative to the print area 54. As shown in FIG. 8B, the enlarged document outline and the enlarged document image extend beyond the print area. If a copy of the document is created with the document positioned as shown in FIG. 8A, some portions of the document image will not be included in the copy. In an embodiment, corrections for magnification are made by the preview system and displayed in real-time so that the magnification can be precisely adjusted before a copy or scan operation is initiated.

Figure 9A:
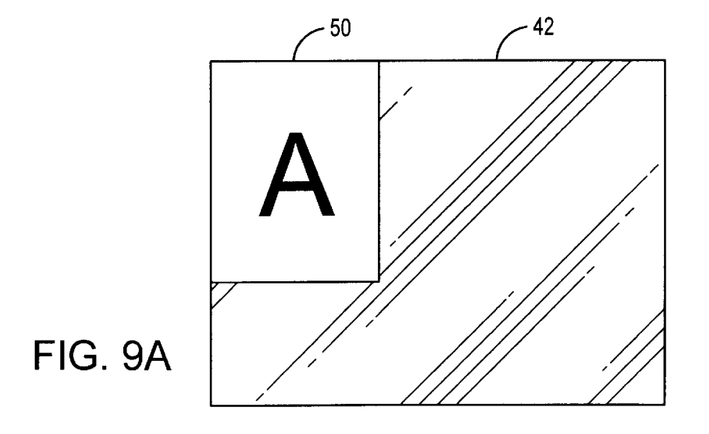
FIG. 9A is a depiction of a document in a standard position on a copy/scan surface.
Figure 9B:
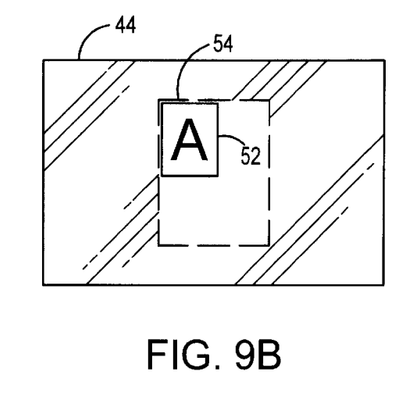
FIG. 9B is a depiction of the display of a reduced version of the document shown in FIG. 9A relative to the print area in accordance with the invention.

FIG. 9A depicts the document 50 in the same position as in FIG. 8A, however, the copy system has been programmed to reduce, or shrink, the document before copying or scanning. FIG. 9B depicts the display of the reduced document outline 52 and the reduced document image relative to the print area 54. As shown in FIG. 9B, the entire document fits within the print area and thus will be included in a copy or scan operation. As with enlargements, changes in the reduction are preferably displayed in real-time by the preview system. In both cases of enlargement or reduction, motion in the x and y planes of the copy/scan surface is preferably displayed in real-time. In one embodiment, the preview system can be directed to automatically adjust the magnification or reduction of a document and/or an image so that the document and/or image utilize the entire print area.

The type of preview sensor 32 utilized in the preview system depends on the level of display resolution that is desired. For example, a simple one bit preview sensor array can be used to sense the outline of a document or to sense the document outline in addition to a low resolution image. A preview sensor array with higher resolution can be utilized to distinguish levels of grayscale. Color filters can also be utilized to provide color previewing if desired. The preview system can be configured to allow a user to select the level of resolution and to select whether only the document outline will be displayed or whether the document image will also be displayed.

If the previewing of only the document outline is required, ambient light may serve as the light source. Utilizing ambient light is appropriate when the cover of the copy system is up, exposing the copy/scan surface.

What is claimed is:

1. A document copy system for copying an image from a document comprising:

means for generating a copy of said document image, said copy generating means including a document copying surface; and means, in optical contact with said document copying surface, for previewing a position of said document relative to said document copying surface, said previewing means including an electronic preview sensor that is dedicated to document previewing and a display device that displays said position of said document relative to said document copying surface in at least partial response to electrical signals from said preview sensor, said electronic preview sensor including rows and columns of discrete sensor elements.

2. The document copy system of claim 1 wherein said position previewing means includes means for previewing said document image relative to said document copying surface in addition to previewing said position of said document.

3. The document copy system of claim 2 wherein said preview sensor is a two-dimensional sensor array that generates image information that is responsive to light reflected from said document, said light information being generated in parallel.

4. The document copy system of claim 3 wherein said two-dimensional sensor array remains in a fixed position relative to said document copying surface while said image information is being generated by said two-dimensional preview sensor array, and two-dimensional preview sensor array being sufficiently large to generate said image information for an entirety of said document while said two-dimensional preview sensor array remains in said fixed position.

5. The document copy system of claim 2 wherein said document image previewing means includes a processing unit that generates print area display signals representing an outline of a print area on said display device relative to said document image.

6. The document copy system of claim 1 wherein said position previewing means includes a processing unit that generates print area display signals that represent an outline of a print area for said copy generating means, said display signals being displayed on said display device.

7. The document copy system of claim 1 wherein said copy generating means includes a photocopy machine having a photosensitive surface that enables generation of a paper copy of said document image.

8. The document copy system of claim 4 wherein said copy generating means includes an electronic scanner having a linear sensor array that is dedicated to image scanning and separate from said preview sensor, wherein said electronics canner generates an electronic copy of said document image.

9. A document copy system for copying an image from a document comprising:

a document copying surface, said document copying surface being transparent such that said document image is visible through said document copying surface when said document is in contact with said document copying surface;

means, operatively associated with said document copying surface, for generating a copy of at least a portion of said document image, said copy generating means having a defined print area associated with each copy operation, said copy generating means including a linear photosensor array that is mounted to scan said defined print area associated with each copy operation; and an electronic preview system, operatively associated with said document copying surface, said preview system including a dedicated preview sensor connected to receive reflected light from said document and to generate electrical signals that are responsive to said reflected light, said preview system further including a display device connected such that for each said copy operation said display device receives electrical signals from said copy generating means that represent said defined print area and receives said electrical signals from said dedicated preview sensor that represent a position of said document relative to said defined print area.

10. The document copy system of claim 9 wherein said dedicated preview sensor is a two-dimensional array of sensor elements that generate image information from said document image, and wherein image signals that are responsive to said image information are displayed on said display device relative to said defined print area.

11. The document copy system of claim 10 wherein said image signals are adjusted by a processing unit to account for magnification or reduction of said document image.

12. The document copy system of claim 10 wherein said dedicated preview sensor is automatically refreshed at least four times per second, thereby enabling real-time display of said position of said document relative to said defined print area.

13. The document copy system of claim 10 wherein said dedicated preview sensor is automatically refreshed at least twenty-four times per second, thereby enabling real-time display of said position of said document relative to said defined print area.

14. The document copy system of claim 9 wherein said preview system includes a light source that is dedicated to said preview system and oriented to direct light at said document copying surface.

15. The document copy system of claim 9 wherein said preview system includes dedicated preview optics located between said document copying surface and said dedicated preview sensor along an optical path of said reflected light.

16. The document copy system of claim 9 wherein said preview system includes a processing unit connected to receive sensor output signals from said dedicated preview sensor and to output preview display signals to said display device.

17. The document copy system of claim 16 wherein said preview display signals are generated by said processing unit in partial response to image magnification or image reduction.

18. A system for previewing and copying a document image comprising:

a document copying system having a copy surface, a copy sensor, and a light source that are utilized to create a paper copy of said document image when a document containing said document image is located on said copy surface, said copy sensor being a row of discrete sensor elements which convert light into electrical signals, said document copying system having a print area representing an area on said copy surface that is copied in a particular copy operation;

a document preview system optically aligned relative to said copy surface to detect light therefrom, said document preview system having a dedicated preview sensor that is distinct from said copy sensor, preview sensor optics connected to direct light from said document image to said preview sensor, and a display device, said dedicated preview sensor including a two-dimensional sensor array that detects said document image from the entire area of said document, said sensor array including rows and columns of discrete sensor elements which convert light into electrical signals; and means, operatively associated with said document copy system and document preview system, for generating display signals representing a position of said document image relative to said print area for said particular copy operation.

19. The system of claim 18 further including means for refreshing said dedicated preview sensor at least four times per second.

* * * * *